United States Patent
Lee et al.

(10) Patent No.: US 12,028,132 B2
(45) Date of Patent: Jul. 2, 2024

(54) MIMO TRANSMISSION APPARATUS AND OPERATING METHOD THEREOF

(71) Applicant: Samsung Electronics Co., Ltd., Suwon-si (KR)

(72) Inventors: Byongok Lee, Bucheon-si (KR); Joohyun Do, Seoul (KR); Hyunseok Yu, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/978,559

(22) Filed: Nov. 1, 2022

(65) Prior Publication Data

US 2023/0155645 A1    May 18, 2023

(30) Foreign Application Priority Data

Nov. 12, 2021    (KR) .................. 10-2021-0156058
Apr. 21, 2022    (KR) .................. 10-2022-0049544

(51) Int. Cl.
*H04B 7/0456*    (2017.01)
*H04B 7/06*    (2006.01)

(52) U.S. Cl.
CPC ......... *H04B 7/0456* (2013.01); *H04B 7/0617* (2013.01); *H04B 7/0634* (2013.01)

(58) Field of Classification Search
CPC ... H04B 7/0456; H04B 7/0617; H04B 7/0634
See application file for complete search history.

(56) References Cited

U.S. PATENT DOCUMENTS

| | | |
|---|---|---|
| 8,582,627 B2 | 11/2013 | Hammarwall et al. |
| 8,705,466 B2 | 4/2014 | Jongren |
| 8,873,661 B2 | 10/2014 | Kent et al. |
| 9,516,602 B2 | 12/2016 | Kim et al. |
| 9,716,539 B2 | 7/2017 | Kim et al. |
| 9,887,744 B2 | 2/2018 | Kwon et al. |
| 9,935,699 B2 | 4/2018 | Kim et al. |
| 10,749,579 B1 | 8/2020 | Omar et al. |
| 2011/0150132 A1* | 6/2011 | Kim ............... H04B 7/0639 375/296 |
| 2013/0102256 A1* | 4/2013 | Cendrillon ........ H04B 7/0854 455/63.4 |
| 2018/0123669 A1* | 5/2018 | Xi .................. H04L 1/0003 |
| 2019/0190569 A1* | 6/2019 | Nayeb Nazar ....... H04B 7/0639 |

(Continued)

FOREIGN PATENT DOCUMENTS

KR    102206549 B1    1/2021

*Primary Examiner* — Janice N Tieu
(74) *Attorney, Agent, or Firm* — Harness, Dickey & Pierce, P.L.C.

(57) ABSTRACT

An operating method of a wireless communication device includes calculating an effective channel matrix between the wireless communication device and a base station based on transmission characteristic information and channel information, the transmission characteristic information corresponding to the wireless communication device, and the channel information corresponding to a channel between the wireless communication device and the base station, determining a precoding matrix based on the effective channel matrix, and determining a transmission beamforming vector based on the precoding matrix.

20 Claims, 11 Drawing Sheets

(56) References Cited

U.S. PATENT DOCUMENTS

2019/0386727 A1\* 12/2019 Jeon ................. H04L 25/03891
2021/0167835 A1\* 6/2021 Wang .................. H04B 7/0469
2022/0166473 A1\* 5/2022 Malek-Mohammadi ...................
  H04L 25/0244

\* cited by examiner

MIMO TRANSMISSION APPARATUS AND OPERATING METHOD THEREOF

CROSS-REFERENCE TO RELATED APPLICATIONS

This application is based on and claims priority under 35 U.S.C. § 119 to Korean Patent Application Nos. 10-2021-0156058 and 10-2022-0049544, filed on Nov. 12, 2021 and Apr. 21, 2022, respectively, in the Korean Intellectual Property Office, the disclosures of which are incorporated by reference herein in their entireties.

BACKGROUND

The inventive concepts relate to a wireless communication device and an operating method thereof, and more particularly, to a wireless communication device performing multiple-input and multiple-output (MIMO) transmission based on transmitter characteristics and an operating method thereof.

A wireless communication system may use various techniques to increase throughput. For example, a wireless communication system may use multiple-input and multiple-output (MIMO) by using a plurality of antennas to increase communication capacity. In line with techniques for increasing throughput, a transmitter may transmit a signal with higher complexity and a receiver may process this complex signal.

A new radio (NR) specification includes a codebook-based transmission mode and a non-codebook-based transmission mode in relation to uplink multiple antenna precoding. In the codebook-based transmission mode, a precoding matrix that may be used by a terminal is determined by a standard. In the non-codebook-based transmission mode, the terminal may calculate the precoding matrix. When the terminal calculates the precoding matrix, to the terminal selects a precoding matrix with higher channel capacity and data rate.

SUMMARY

The inventive concepts relate to a wireless communication device performing multiple antenna based transmission and reception by determining a precoding matrix based on transmitter characteristics and channel information, and an operating method of the wireless communication device.

According to an aspect of the inventive concepts, there is provided a method of operating a wireless communication device, including calculating an effective channel matrix between the wireless communication device and a base station based on transmission characteristic information and channel information, the transmission characteristic information corresponding to the wireless communication device, and the channel information corresponding to a channel between the wireless communication device and the base station, determining a precoding matrix based on the effective channel matrix, and determining a transmission beamforming vector based on the precoding matrix.

According to an aspect of the inventive concepts, there is provided a wireless communication device including processing circuitry configured to calculate an effective channel matrix between the wireless communication device and a base station based on transmission characteristic information and channel information, the transmission characteristic information corresponding to the wireless communication device, and the channel information corresponding to a channel between the wireless communication device and the base station, determine a precoding matrix based on the effective channel matrix, and determine a transmission beamforming vector based on the precoding matrix.

According to an aspect of the inventive concepts, there is provided a wireless communication system including a wireless communication device and a base station. The base station may be configured to transmit a channel status information-reference signal (CSI-RS) to the wireless communication device. The wireless communication device may be configured to estimate an uplink channel based on the CSI-RS and channel reciprocity to obtain channel information, calculate an effective channel matrix between the wireless communication device and the base station based on transmission characteristic information and the channel information, the transmission characteristic information corresponding to the wireless communication device, determine a precoding matrix based on the effective channel matrix, and determine a transmission beamforming vector based on the precoding matrix.

BRIEF DESCRIPTION OF THE DRAWINGS

Embodiments of the inventive concepts will be more clearly understood from the following detailed description taken in conjunction with the accompanying drawings in which.

DETAILED DESCRIPTION

Figure 1:
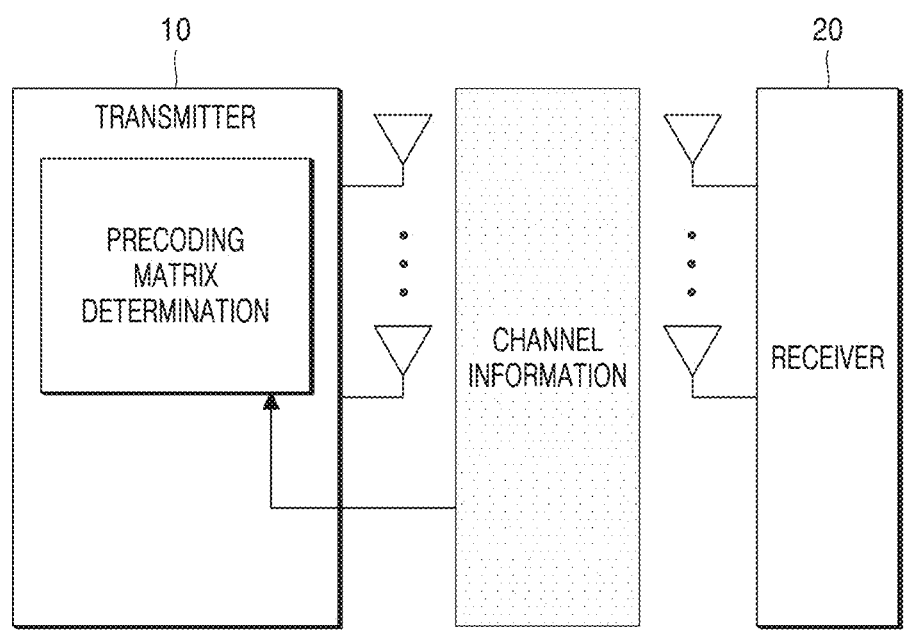
FIG. 1 illustrates an operating method of a wireless communication system according to embodiments of the inventive concepts, for determining a multiple-input and multiple-output (MIMO) transmission method by using channel information.

In embodiments of the inventive concepts, a wireless communication device communicating with a base station, or another wireless communication device, may be referred to as a node, user equipment (UE), next generation UE (NG UE), a mobile station (MS), mobile equipment (ME), a device, a terminal, etc.

In addition, the wireless communication device may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, medical equipment, a camera, a wearable device, etc. In addition, the wireless communication device may include at least one of a television, a digital video disk (DVD) player, an audio device, a refrigerator, an air conditioner, a vacuum cleaner, an oven, a microwave, a washing machine, an air purifier, a set-top box, a home automation control panel, a security control panel, a media box (for example: Samsung HomeSync™, Apple TV™, or Google TV™), a game console (for example, Xbox™, or PlayStation™), an electronic dictionary, an electronic key, a camcorder, an electronic frame, etc. In addition, the wireless communication device may include at least one of various medical devices (for example, various portable medical measuring devices such as a blood glucose meter, a heart rate monitor, a blood pressure monitor, a body temperature meter, magnetic resonance angiography (MRA) device, magnetic resonance imaging (MRI) device, computed tomography (CT) device, a shooter, a sonicator, etc.), a navigation device, a global navigation satellite system (GNSS) receiver, an event data recorder (EDR), a flight data recorder (FDR), an automotive infotainment device, marine electronic equipment (for example, a ship navigation system or a gyro compass), avionics, a security device, a vehicle head unit, an industrial or household robot, a drone, an automated teller machine (ATM) of a financial institution, a point of sales (POS), an Internet of things (IoT) device (for example, a light bulb, one of various sensors, a sprinkler device, a fire alarm, a temperature regulator, a street light, a toaster, a motor device, a hot water tank, a heater, a boiler, etc.), etc. The wireless communication device may include various kinds of multimedia systems capable of performing a communication function.

The base station may communicate with the wireless communication device and allocate a communication network resource to the wireless communication device. The base station may include at least one of a cell, a NodeB (NB), an eNodeB (eNB), a gNodeB (gNB), a next generation radio access network (NG RAN), a wireless access unit, a base station controller, a node on a network, etc. A transmitter may refer to a node providing a data service and/or a voice service. The node may be fixed or movable. A receiver may refer to a node receiving a data service and/or a voice service. For example, in an uplink, the terminal may be the transmitter and the base station may be the receiver. In a downlink, the terminal may be the receiver and the base station may be the transmitter. Hereinafter, embodiments of the inventive concepts will be described in detail with reference to the accompanying drawings.

FIG. 1 illustrates an operating method of a wireless communication system according to embodiments of the inventive concepts, for determining a multiple-input and multiple-output (MIMO) transmission method by using channel information.

The wireless communication system may include a transmitter 10 and a receiver 20. The transmitter 10 may include at least one of a UE or a base station. The receiver 20 may include at least one of the UE or the base station.

Referring to FIG. 1, the transmitter 10 may determine a multiple antenna transmission method by using the channel information. According to embodiments, the channel information may correspond to (e.g., characterize, etc.) a channel between the transmitter 10 and the receiver 20. The transmitter 10 may obtain the channel information from the receiver 20. As a specific example, the base station may transmit a channel status information-reference signal (CSI-RS) to the UE. The UE may estimate a downlink channel based on the received CSI-RS. Then, the UE may transmit a channel information feedback to the base station. The base station may obtain downlink channel information by receiving the channel information feedback from the UE. As another example, the UE may estimate an uplink channel by using the received CSI-RS based on channel reciprocity. According to embodiments, the UE may estimate the uplink channel based on the concept of channel reciprocity with respect to the downlink channel information represented by the CSI-RS.

As another specific example, the UE may transmit a sounding reference signal (SRS) to the base station. The base station may obtain uplink channel information based on the received SRS. In addition, the base station may obtain the downlink channel information by using the received SRS based on channel reciprocity.

The transmitter 10 and/or the receiver 20 may obtain the channel information through various reference signals, a synchronization signal block (SSB), and/or a feedback and the inventive concepts are not limited thereto.

Referring to FIG. 1, the transmitter 10 may determine a precoding matrix by using the channel information and may determine a beamforming vector based on the determined precoding matrix. Accordingly, the transmitter 10 may transmit data to the receiver 20 based on the determined beamforming vector.

Multiple-input and multiple-output (MIMO) is a technology capable of increasing spectral efficiency based on a spatial domain formed by multiple antennas. In terms of downlink, MIMO is actively used in long term evolution (LTE) and new radio (NR) commercial networks (e.g., NR communication networks). In terms of uplink, MIMO has been commercialized in full-scale in NR networks. As a result, interest in uplink MIMO is increasing. An NR uplink MIMO transmission mode includes a non-codebook-based uplink transmission mode. In this case, the UE calculates the precoding matrix. A conventional precoding matrix determination method considers only the channel information.

According to the inventive concepts, a method of a device is provided for determining an optimal or improved precoding matrix in consideration of characteristics of the device as well as the channel information in relation to the uplink MIMO.

Figure 2:
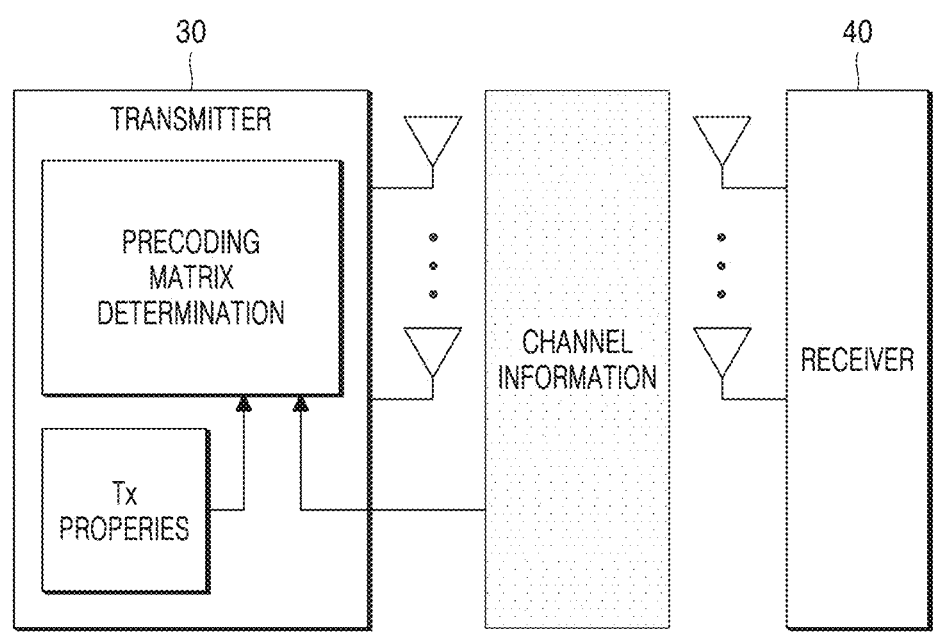
FIG. 2 illustrates an operating method of a wireless communication system according to embodiments of the inventive concepts, for transmitting a signal based on channel information and transmitter characteristics.

FIG. 2 illustrates a method of a wireless communication system according to embodiments of the inventive concepts for transmitting a signal based on channel information and transmitter characteristics.

Referring to FIG. 2, a transmitter 30 may determine a precoding matrix by using not only the channel information but also the transmitter characteristics. More specifically, the transmitter 30 may determine the precoding matrix by using the channel information and the transmitter characteristics. The transmitter 30 may determine a transmit beamforming vector by using the determined precoding matrix. The transmitter 30 may transmit data to a receiver 40 based on the determined transmit beamforming vector. According to embodiments, the transmitter 30 may include at least one of a UE or a base station, and the receiver 40 may include at least one of the UE or the base station. According to embodiments, the transmitter 30 may obtain the channel information according to one or more of the implementations discussed in connection with FIG. 1.

Figure 3:
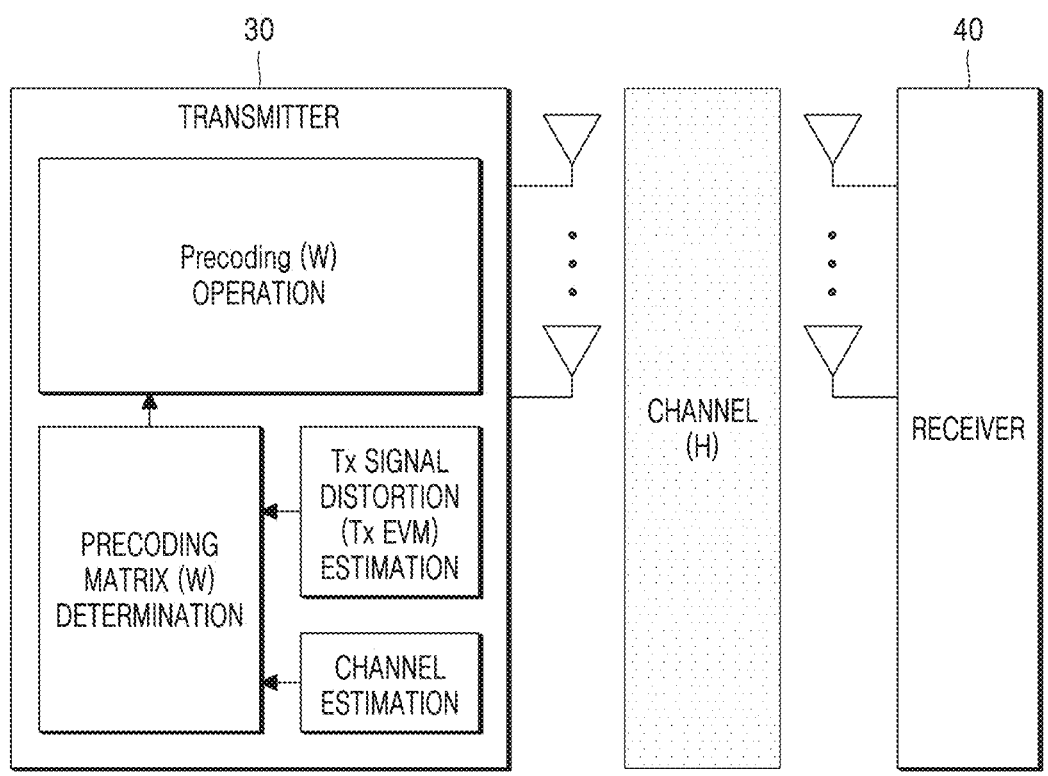
FIG. 3 illustrates an operating method of a wireless communication device according to embodiments of the inventive concepts, for transmitting a signal based on channel information and transmitter characteristics.

FIG. 3 illustrates a method of a wireless communication device according to embodiments of the inventive concepts for transmitting a signal based on channel information and transmitter characteristics.

Referring to FIG. 3, the transmitter 30 (e.g., the wireless communication device) may estimate distortion of a transmitter signal. In other words, the transmitter 30 may grasp (e.g., determine, obtain, etc.) the transmitter characteristics. The transmitter characteristics may include error vector magnitude (EVM) information of each transmission path (e.g., each MIMO transmission path). An EVM may represent a degree of distortion of a generated signal with respect to an ideal transmit signal. For example, it may be determined that signal quality is higher when the EVM is 2% (or less) and that signal quality is lower when the EVM is 10% (or more). According to embodiments, the terms "EVM" and "EVM information" may be used interchangeably. According to embodiments, the EVM information corresponds to (e.g., characterizes, etc.) the EVM, and thus, description of the EVM information also describes the corresponding EVM.

The EVM information may include at least one of additional white Gaussian noise (AWGN), power amplifier non-linearity, in-phase and quadrature (IQ) mismatch, phased noise, local oscillator leakage (LOL), digital to analog conversion (DAC) (or analog to digital conversion (ADC)) quantization noise, and/or thermal noise.

The AWGN as common noise may have a uniform distribution in all frequency bands. Because the AWGN is additive, the AWGN may be added to all unique noise of an information system. White may mean that power is uniform in all frequency bands. The AWGN may statistically follow the Gaussian distribution.

A power amplifier may have characteristics in which output power increases in direct proportion to input power in a region with small input signal power. When the input power gradually increases, the output power may not be proportional to the input power. Therefore, the power amplifier may have non-linear characteristics.

The IQ mismatch may refer to that a phase difference between an in-phase signal and a quadrature signal is not accurately (e.g., exactly) 90 degrees. A receiver including a local oscillator (LO) may generate a sine wave and a signal obtained by delaying the sine wave 90 degrees. These signals may be respectively mixed with RF signals to be the in-phase signal and the quadrature signal, respectively.

Phased noise related to instability of a signal frequency in a frequency region may refer to phase deviation continuously changing near a reference frequency. The phased noise may refer to that a sine waveform of a signal looks shaky (e.g., small, rapid variations in magnitude) in a time domain.

When a signal leaked from the LO is mixed with a local oscillator frequency in a mixer, a meaningless DC component (e.g., a DC component without signal information) may be output. Such a challenge (e.g., the leaked signal and/or the corresponding DC component) may be referred to as the LOL.

When continuous signal waves are quantized, a quantized signal may have an error with respect to the original signal. Such an error may be referred to as the quantization noise. The quantization noise may be reduced by fine-tuning a quantization level. In this case, an amount of data may increase and transmission efficiency may be reduced.

The thermal noise generated by thermal energy may increase as a temperature (e.g., the amount of thermal energy) increases. The thermal noise mostly generated by a resistor may be a cause of thermal noise inside a device (e.g., the transmitter 30).

The EVM information may vary depending on a frequency band and/or transmit power.

According to embodiments, value(s) of the EVM information (and/or of the corresponding EVM) may vary (or change) depending on the frequency band and/or transmit power used by the transmitter 30. According to embodiments, value(s) of the EVM information (and/or of the corresponding EVM) may be difference for each frequency band and/or transmit power used by the transmitter 30. The transmitter 30 may estimate the EVM information of each transmission path through (e.g., during) calibration. In addition, the transmitter 30 may estimate the EVM information of each transmission path through a feedback receiver.

As described above, the transmitter 30 may directly estimate a channel or may obtain the channel information from the receiver 40. The transmitter 30 may determine the precoding matrix by using the channel information and the EVM information. Hereinafter, a method of the transmitter 30 determining the preceding matrix by using the channel information and the EVM information will be described.

The following EQUATION 1 represents a received signal.

$$y = H(Wx + n - n_{TX}) + n_{RX} \quad \text{[EQUATION 1]}$$

wherein, y represents a received signal vector of $N_r \times 1$. $N_r$ represents the number of receiving antennas. H represents an MIMO channel matrix of $N_r \times N_t$. $N_t$ represents the number of transmitting antennas. W represents a precoding matrix of $N_t \times N_r$. The precoding matrix satisfies $(WW^H) = \|W\|_F^2 = 1$. $W^H$ represents the Hermitian matrix of W. x represents a transmit signal vector of $N_t \times 1$. The transmit signal vector satisfies $E[xx^H] = I_{Nt}$. $I_{Nt}$ represents an identity matrix of $N_t \times N_t$. $n_{RX}$ represents a noise vector at a receiving end of $N_r \times 1$. The noise vector at the receiving end satisfies $E[n_{RX} n_{RX}^H] = \sigma_N^2 I_{Nr}$. $I_{NR}$ represents an identity matrix of $N_r \times N_r$. $\sigma_N^2$ represents $$\frac{1}{SNR}.$$

represents a noise vector at a transmitter of $N_t \times 1$. The following EQUATION 2 represents an $R_{TX}$ matrix including the EVM information of each transmission path.

$$E\left[n_{TX} n_{TX}^H\right] = \begin{bmatrix} (EVM)_1^2 & 0 & 0 \\ 0 & \cdots & 0 \\ 0 & 0 & (EVM)_{Nt}^2 \end{bmatrix} = R_{TX} \quad \text{[EQUATION 2]}$$

wherein, $n_{TX}$ represents a noise vector at a transmitter of $N_t \times 1$. The EVM represents a distortion estimate of the transmitter signal. The EVM of each transmission path may vary. The EVM may include at least one of additional white Gaussian noise (AWGN), power amplifier non-linearity, in-phase and quadrature (IQ) mismatch, phased noise, local oscillator leakage (LOL), digital to analog conversion (DAC) quantization noise, and/or thermal noise.

The following EQUATION 3 is obtained by performing term theorem on the received signal of the EQUATION 1.

$$y = H(Wx + n_{TX}) + n_{RX} = (HWx) + (Hn_{TX} + n_{RX}) \quad \text{[EQUATION 3]}$$

wherein, (HWx) represents a desired signal term. ($Hn_{TX} + n_{RX}$) represents a noise term. The noise term includes noise information at the transmitter as well as noise at the receiving end. The noise term may be whitened so that singular vector decomposition (SVD) and a water-filling algorithm may be applied.

The following EQUATION 4 represents channel capacity including transmitter characteristic information. According to embodiments, the transmitter characteristic information may also be referred to herein as transmission characteristic information.

$$C = \log_2 \det(I_{N_r} + K_D K_N^{-1})$$

$$K_D = E[(HWx)(HWx)^H] = (HW)(HW)^H$$

$$K_N = E[(Hn_{TX} + n_{RX})(Hn_{TX} + n_{RX})^H] = HR_{TX}H_H + \sigma_N^2 I_{N_r} \quad \text{[EQUATION 4]}$$

wherein, C represents the channel capacity. $I_{N_r}$ represents an identity matrix of $N_r \times N_r$. $K_D$ is an equation related to a signal term. $K_N$ is an equation related to noise. H represents a channel matrix of $N_r \times N_t$. W represents a precoding matrix of $N_t \times N_t$. $n_{RX}$ represents a noise vector at a receiving end of $N_r \times 1$. $n_{TX}$ represents a noise vector at a transmitter of $N_t \times 1$. $\sigma_N^2$ represents $$\frac{1}{SNR}.$$

$R_{TX}$ represents an EVM related matrix of the transmitter, which is described above in the EQUATION 2.

The following EQUATION 5 represents SVD for an effective channel matrix.

$$\overline{H} = K_N^{-\frac{1}{2}} H = \overline{U}\overline{S}\overline{V}^H \quad \text{[EQUATION 5]}$$

wherein, $\overline{H}$ may represent the effective channel matrix. Here, the effective channel matrix may be whitened and may be referred to as an effective channel based on the transmitter characteristics. $K_N$ represents a signal related matrix described above in the EQUATION 4.

$\overline{U}$, $\overline{S}$, and $\overline{V}$ represent matrices obtained by performing SVD on the effective channel matrix. $\overline{U}$ may be a matrix $N_r \times N_r$. $\overline{S}$ may be a matrix $N_r \times N_t$ having a singular value as a diagonal element. $\overline{V}$ may be a matrix $N_t \times N_t$.

The following EQUATION 6 represents an optimal or improved precoding matrix maximizing or increasing the above-described channel capacity. According to embodiments, the transmitter 30 may use the determined precoding matrix to perform a non-codebook-based precoding operation for generating a beamforming vector.

$$W_{opt} = P^{\frac{1}{2}}\overline{V} \quad \text{[EQUATION 6]}$$

wherein, P may represent a diagonal matrix having power allocated to a corresponding stream (e.g., an amount of power allocated to each transmission path) as a diagonal element. P may be determined by applying a water-filling algorithm to $\overline{S}$ of the EQUATION 5. P may represent a ratio of power allocated to each stream (e.g., each transmission path of the transmitter 30). According to embodiments, P may represent a respective ratio of (1) a power amount allocated to a corresponding stream to (2) a total amount of power allocated to all streams, for each stream among the upload streams of the transmitter 30. The water-filling algorithm may refer to a technique for allocating more power to a channel in good condition (or with a high signal-to-noise ratio (SNR)) and allocating less or no power to a channel in bad condition (or with a low SNR). $\overline{V}$ is a matrix obtained by performing SVD on the effective channel matrix described above in the EQUATION 5. According to embodiments, $\overline{S}$ is a matrix obtained by performing SVD on the effective channel matrix described above in the EQUATION 5.

Figure 4:
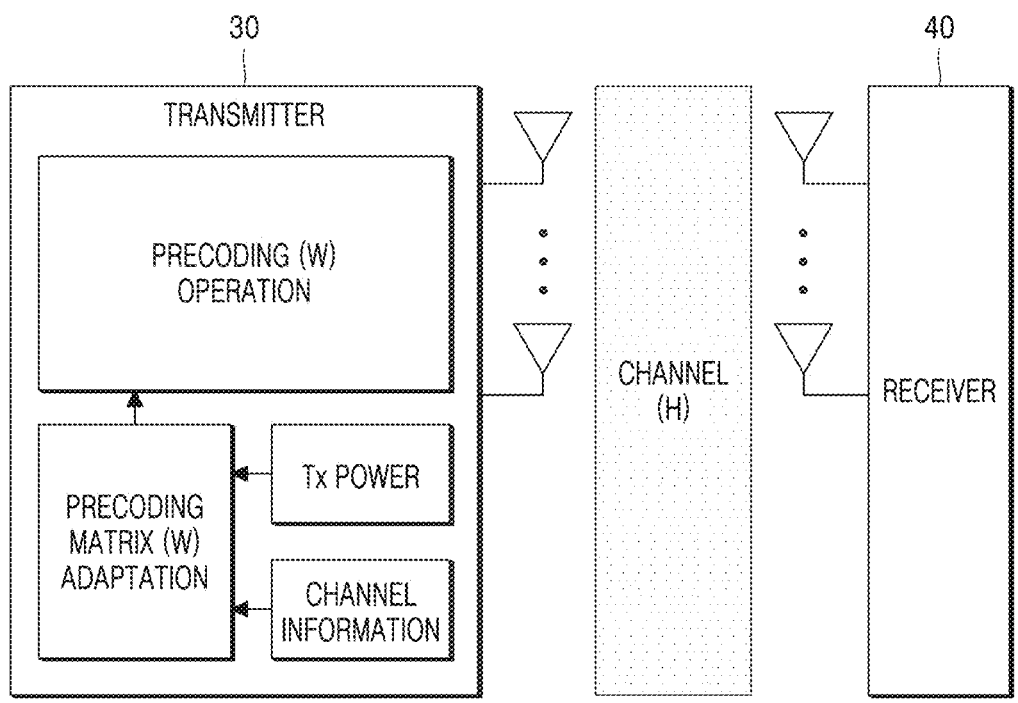
FIG. 4 illustrates an operating method of a wireless communication device according to embodiments of the inventive concepts, for adaptively configuring a precoding matrix in accordance with transmit power.

FIG. 4 illustrates a method of a wireless communication device according to embodiments of the inventive concepts for adaptively configuring a precoding matrix in accordance with transmit power.

When transmit power changes, an EVM of a transmission path may change. As a specific example, the EVM may change due to PA non-linearity characteristics when the transmit power changes. Therefore, as the transmit power of the transmitter 30 changes, the EVM may change such that effectiveness of the precoding matrix may change (e.g., decrease). The transmitter 30 may adaptively determine the precoding matrix as the transmit power changes.

For example, the transmitter 30 may recalculate (e.g., update) the precoding matrix whenever the transmit power changes (e.g., in response to the transmit power changing) by a certain amount (e.g., a predefined or alternatively, given threshold amount). As another example, the transmitter 30 may create (and store) a table by pre-deriving (or deriving) the EVM in accordance with the transmit power. Accordingly, the transmitter may find the corresponding EVM in the table to determine the precoding matrix again when the transmit power changes.

Figure 5A:
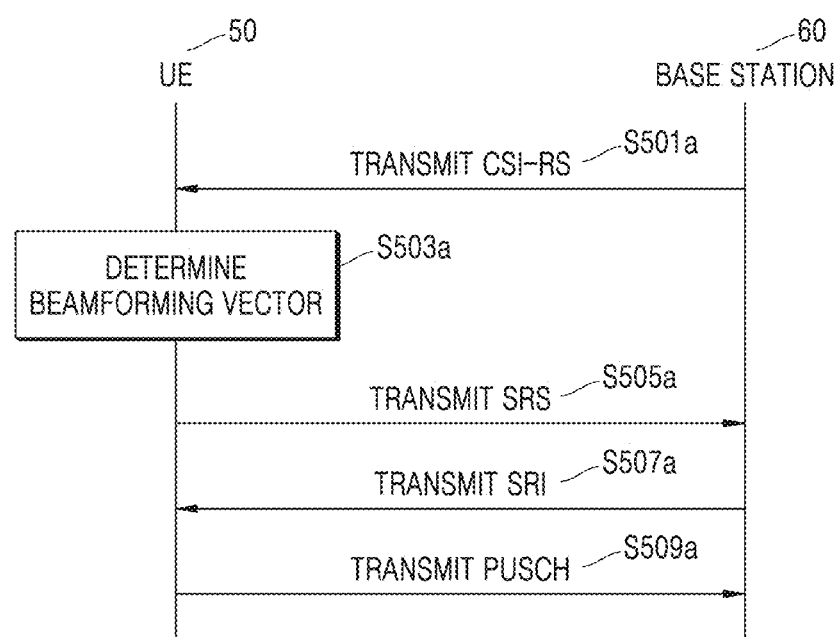
FIGS. 5A and 5B illustrate an NR non-codebook-based uplink transmission process of a wireless communication device according to embodiments of the inventive concepts.
Figure 5B:
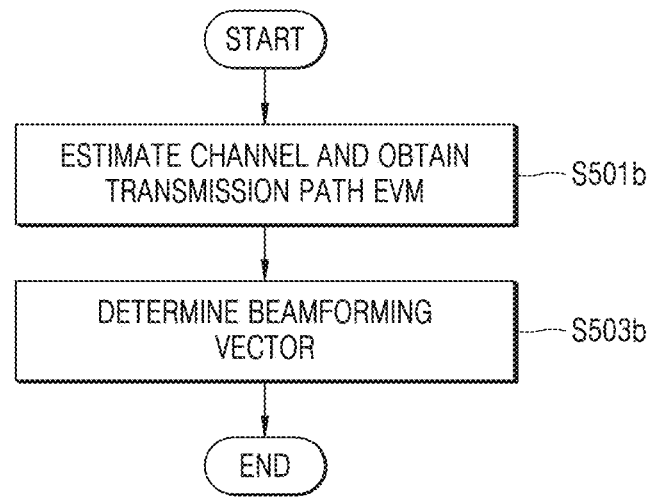

FIGS. 5A and 5B illustrate an NR non-codebook-based uplink transmission process of a wireless communication device according to embodiments of the inventive concepts.

Specifically, FIG. 5A illustrates an operation process between UE 50 and a base station 60 in non-codebook-based precoding. FIG. 5B illustrates a process of the UE 50 for determining a beamforming vector in the non-codebook-based precoding.

An NR uplink multiple antenna transmission method may be divided into a codebook-based transmission mode and a non-codebook-based transmission mode. In the codebook-based transmission mode, the precoding matrix is determined by a standard. The base station may select the precoding matrix to be used by the UE and may inform the UE of the selected precoding matrix through an uplink scheduling grant. The UE may transmit a physical uplink shared channel (PUSCH) to the base station by mapping a transport layer to an antenna port by using the precoding matrix. According to embodiments, transmitting the PUSCH may include transmitting (e.g., transmitting data and/or control information) on the PUSCH. The base station estimates a channel between the UE and the base station in order to select a proper rank and a precoding matrix. Accordingly, in UE set to be in the codebook-based transmission mode, at least one multiple port SRS transmission is set. The base station may determine a rank and an uplink precoding matrix by using a measurement result based on an SRS.

In the non-codebook-based precoding, the UE may transmit the PUSCH to the base station based on the precoding matrix selected by the UE. The UE may receive a CSI-RS from the base station and may measure a downlink channel. The UE may select an uplink multiple layer precoder based on the measured downlink channel. In this process, an uplink precoding matrix selection method according to the inventive concepts may be applied, which will be described in detail hereinafter.

Referring to FIG. 5A, in operation S501a, the base station 60 may transmit the CSI-RS to the UE 50. In operation S503a, the UE 50 may determine the beamforming vector based on the received CSI-RS. Hereinafter, a beamforming vector determination process will be described in detail.

Referring to FIG. 5B, in operation S501b, the UE 50 may estimate the downlink channel based on the received CSI-RS. The UE 50 may select an uplink multiple layer precoding matrix based on the estimated downlink channel. For example, the UE may select the uplink multiple layer precoding matrix by using the estimated downlink channel based on channel reciprocity. In addition, the UE 50 may obtain EVM information of a transmission path. The EVM information may include at least one of additional white Gaussian noise (AWGN), power amplifier non-linearity, in-phase and quadrature (IQ) mismatch, phased noise, local oscillator leakage (LOL), digital to analog conversion (DAC) quantization noise, and/or thermal noise.

In operation S503b, the UE 50 may determine the uplink multiple layer precoding matrix based on the estimated downlink channel and the EVM information of the transmission path. According to embodiments, the UE 50 may determine the uplink multiple layer precoding matrix based on the estimated downlink channel and the EVM information according to the equations discussed in association FIG. 3. The UE 50 may determine the beamforming vector based on the determined uplink multiple layer precoding matrix.

Referring to FIG. 5A again, in operation S505a, the UE 50 may transmit the SRS to the base station 60 based on the determined beamforming vector. For example, the UE 50 may respectively transmit a plurality of SRSs to beams corresponding to columns of the determined uplink multiple layer precoding matrix. According to embodiments, the UE 50 may transmit each respective SRS among a plurality of SRSs to a corresponding beam among beams related to columns of the determined uplink multiple layer precoding matrix. The base station 60 may receive the plurality of SRSs and may determine the rank and the beamforming vector to be used by the UE 50 transmitting the PUSCH. For example, the base station 60 may select some SRS beams from among the plurality of SRS beams received from the UE 50.

In operation S507a, the base station 60 may transmit a sounding reference signal resource indicator (SRI) to the UE 50. The SRI may include the rank and beamforming vector (e.g., beamforming vector information) to be used for transmitting the PUSCH. For example, the SRI may include information on the SRS beams selected by the base station. The UE 50 may receive the SRI from the base station 60.

In operation S509a, the UE 50 may determine the rank and beamforming vector to be used for transmitting the PUSCH based on the received SRI. The UE 50 may transmit the PUSCH to the base station 60 based on the determined rank and beamforming vector. For example, the UE 50 may determine the beamforming vector based on the SRS beams selected by the base station from among the plurality of SRS beams transmitted by the UE to the base station. In addition, the UE 50 may transmit the PUSCH to the base station 60 based on the determined beamforming vector.

Figure 6A:
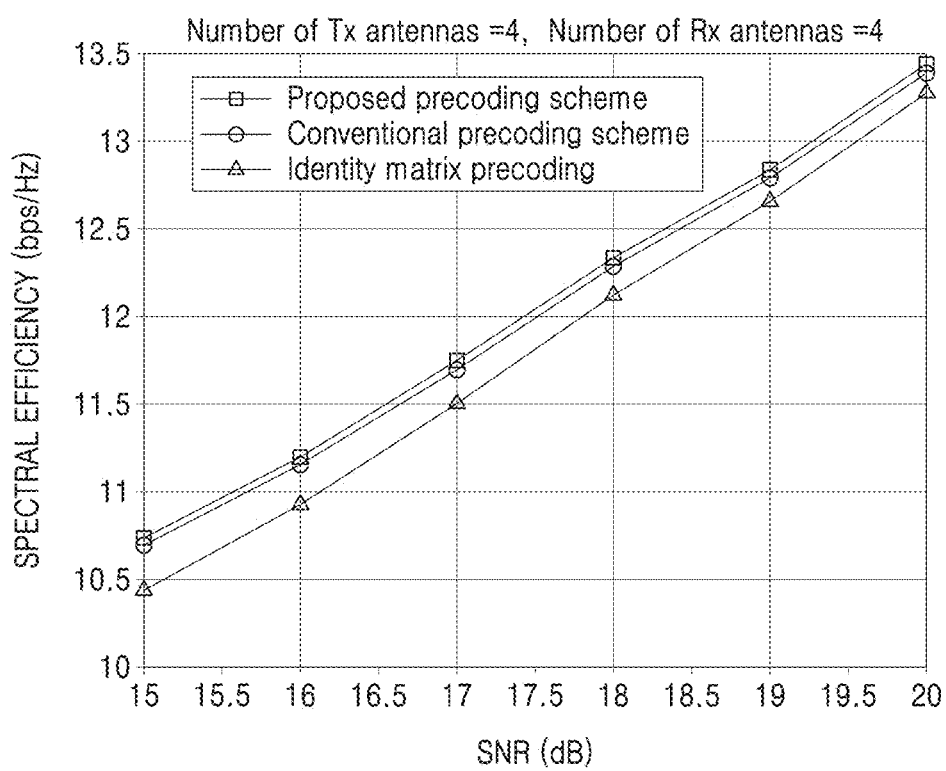
FIGS. 6A and 6B illustrate a simulation result for a wireless communication device according to embodiments of the inventive concepts.
Figure 6B:
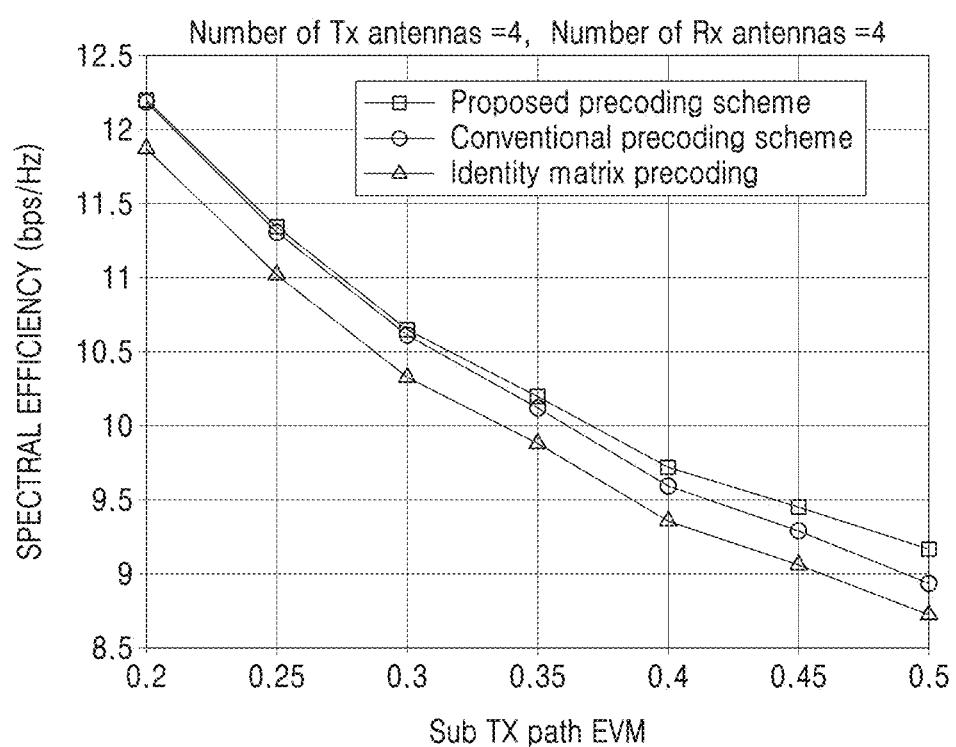

FIGS. 6A and 6B illustrate a simulation result of a wireless communication device according to embodiments of inventive concepts.

Referring to FIG. 6A and FIG. 6B, in an identity matrix precoding scheme, it is assumed that equal power (or nearly equal power) is allocated to each path by applying identity matrix beamforming. In a conventional precoding scheme, it is assumed that power is allocated to each path by applying channel matrix based SVD beamforming and the water-filling algorithm. In a proposed precoding scheme according to embodiments, it is assumed that power is allocated to each path by applying "TX EVM-aware" effective channel matrix based SVD beamforming and the water-filling algorithm. In a present example, each of the number of radiators and the number of receiving antennas is assumed to be four. The channel is assumed to be a Rayleigh fading channel.

Referring to FIG. 6A, a transmission path EVM is assumed to be [0.01 0.01 0.3 0.3]. It is noted that spectral efficiency (SE) of the proposed precoding scheme for each SNR is higher than that of the conventional precoding scheme and identify matrix precoding.

Referring to FIG. 6B, the SNR is assumed to be 15 dB. A main transmission path EVM is assumed to be 0.01. As a sub-transmission path EVM increases, a difference between frequency efficiency in accordance with the proposed precoding scheme and frequency efficiency in accordance with the conventional precoding scheme increases. As the transmission path EVM and an EVM difference between the transmission paths increase, performance increases in comparison with the conventional precoding scheme.

Figure 7:
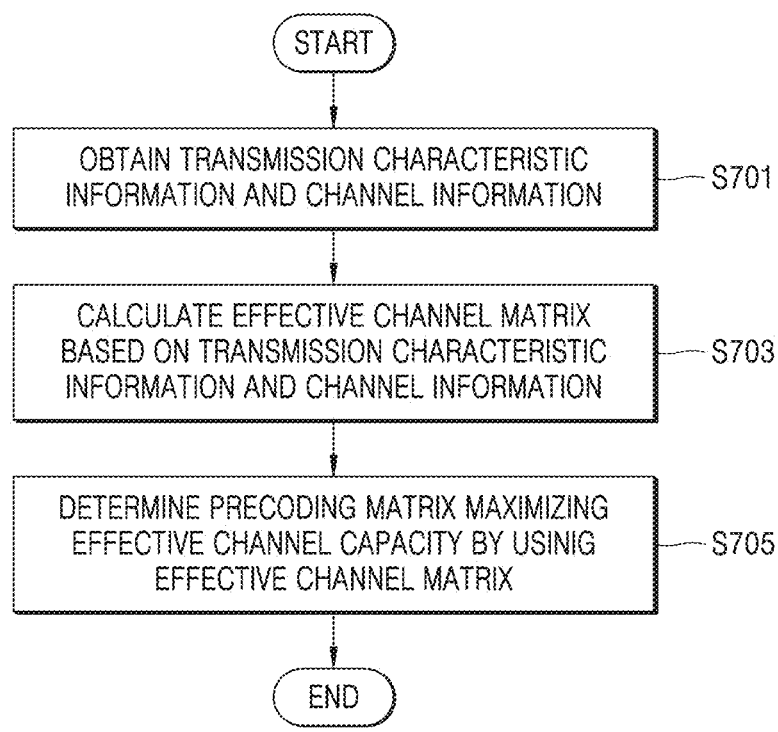
FIG. 7 illustrates an operation process of a wireless communication device according to embodiments of the inventive concepts.

FIG. 7 illustrates an operation process of a wireless communication device according to embodiment of the inventive concepts.

In operation S701, the wireless communication device may obtain transmission characteristic information and channel information. For example, the wireless communication device may obtain the transmission characteristic information by feeding back a modulated transmit signal before signaling the modulated transmit signal.

As another example, the wireless communication device may obtain the transmission characteristic information by performing calibration on the transmit signal in a process of modulating the transmit signal. For example, the wireless communication device may perform calibration whenever (e.g., every time) the wireless communication device is turned on. As another example, the wireless communication device may perform calibration whenever (e.g., each time) data is transmitted by the wireless communication device.

The transmission characteristic information may include at least one of additional white Gaussian noise (AWGN), power amplifier non-linearity, in-phase and quadrature (IQ) mismatch, phased noise, local oscillator leakage (LOL), digital to analog conversion (DAC) quantization noise, and/or thermal noise. The transmission characteristic information may be modeled based on the EVM. The EVM may change based on at least one of a frequency band and/or transmit power. According to embodiments, the transmission characteristic information may correspond to (e.g., include, etc.) the EVM information and/or transmitter characteristics.

The wireless communication device may obtain the channel information. For example, the wireless communication device may receive the CSI-RS from the base station and may estimate the downlink channel based on the received CSI-RS.

In operation S703, the wireless communication device may calculate the effective channel matrix based on the transmission characteristic information and the channel information.

In operation S705, the wireless communication device may determine a precoding matrix maximizing or increasing effective channel capacity by using the effective channel matrix. As an example, the wireless communication device may determine the precoding matrix based on a first matrix generated by applying SVD to the effective channel matrix and an allocated power ratio per transmission path. The first matrix may correspond to $\overline{V}$ that is one of the matrices obtained by the wireless communication device performing SVD on the effective channel matrix in the above-described EQUATION 5. The allocated power ratio per transmission path may be determined by applying the water-filling algorithm to a second matrix generated by applying SVD to the effective channel matrix. The second matrix may correspond to S that is one of the matrices obtained by the wireless communication device performing SVD on the effective channel matrix in the above-described EQUATION 5.

The wireless communication device may determine a transmit beamforming vector based on the determined precoding matrix. The wireless communication device may transmit the SRS to the base station based on the determined transmit beamforming vector. The base station may determine the rank and beamforming vector related to transmission of the PUSCH based on the received SRS. The base station may transmit the SRI including the determined rank and beamforming vector related to transmission of the PUSCH to the wireless communication device. The wireless communication device may receive the SRI from the base station. The wireless communication device may transmit the PUSCH to the base station based on the received SRI.

Figure 8:
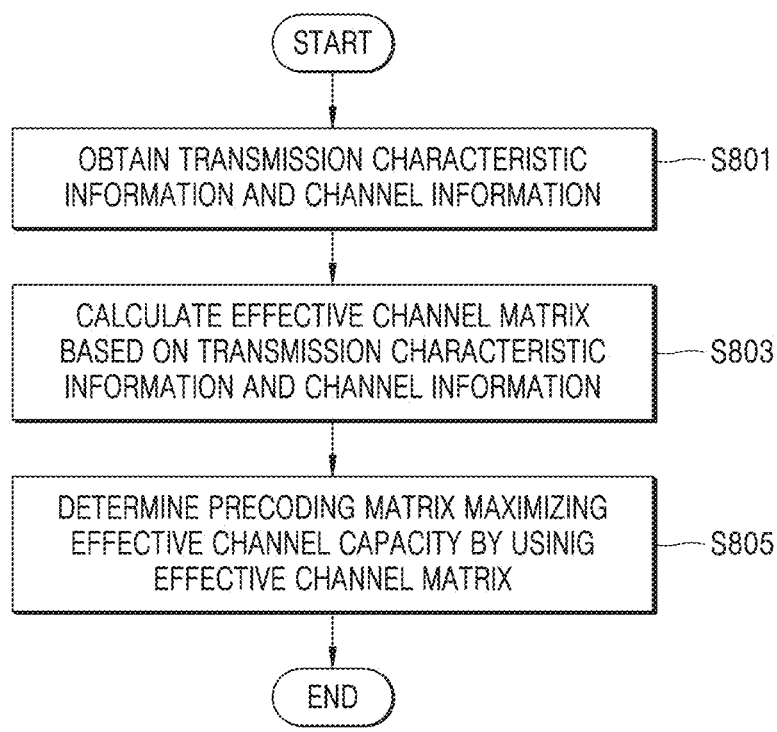
FIG. 8 illustrates an operation process of a base station according to embodiments of the inventive concepts.

FIG. 8 illustrates an operation process of a base station according to embodiments of the inventive concepts.

In operation S801, the base station may obtain the transmission characteristic information and the channel information. For example, the base station may obtain the transmission characteristic information by feeding back a modulated transmit signal before signaling the modulated transmit signal. As another example, the base station may obtain the transmission characteristic information by performing calibration on the transmit signal in a process of modulating the transmit signal.

The base station may obtain the channel information. For example, the base station may receive the SRS from the wireless communication device and may estimate a channel based on the received SRS. As another example, the base station may obtain the channel information by transmitting the CSI-RS to the wireless communication device and receiving a report message of the CSI-RS from the wireless communication device.

In operation S803, the base station may calculate the effective channel matrix based on the transmission characteristic information and the channel information.

In operation S805, the base station may determine a precoding matrix maximizing or increasing effective channel capacity by using the effective channel matrix. As an example, the base station may determine the precoding matrix based on a first matrix generated by applying SVD to the effective channel matrix and an allocated power ratio per transmission path. The first matrix may correspond to $\overline{V}$ that is one of the matrices obtained by the wireless communication device performing SVD on the effective channel matrix in the above-described EQUATION 5. The allocated power ratio per transmission path may be determined by applying the water-filling algorithm to a second matrix generated by applying SVD to the effective channel matrix. The second matrix may correspond to S that is one of the matrices obtained by the wireless communication device performing SVD on the effective channel matrix in the above-described EQUATION 5.

The base station may determine a transmit beamforming vector based on the determined precoding matrix. The base station may transmit data to the wireless communication device based on the determined transmit beamforming vector. For example, the base station may transmit a physical downlink control channel (PDCCH) and/or a physical downlink shared channel (PDSCH) based on the determined transmit beamforming vector.

Figure 9:
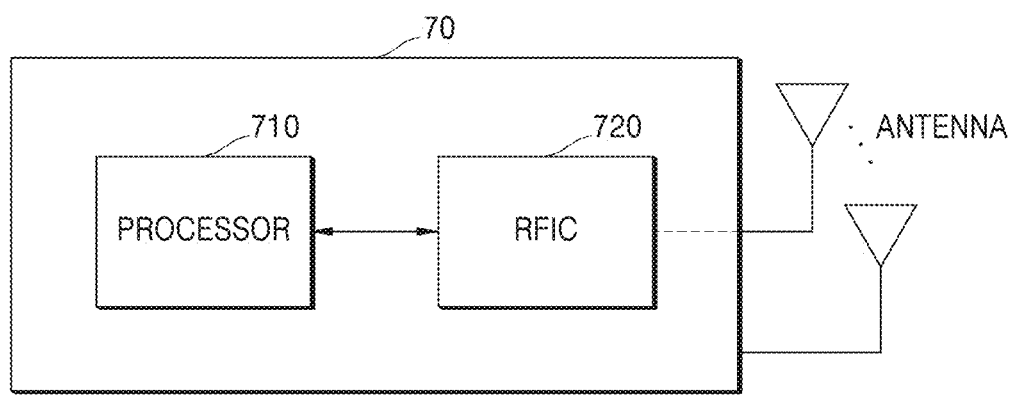
FIG. 9 is a block diagram of a wireless communication device according to embodiments of the inventive concepts.

FIG. 9 is a block diagram of a wireless communication device 70 according to embodiments of the inventive concepts.

Referring to FIG. 9, the wireless communication device 70 may include at least one processor 710 and/or at least one radio frequency integrated circuit (RFIC) 720. The at least one processor 710 may control the RFIC 720 and may implement an operation method (as illustrated in an operation flowchart, such as that of FIGS. 5B, 7 and/or 8) of the wireless communication device 70 according to the inventive concepts. The wireless communication device 70 may have a plurality of antennas and the RFIC 720 may transmit and receive a wireless signal through one or more antennas. At least some of the plurality of antennas may correspond to (e.g., may be) the radiators. The radiator(s) may transmit a wireless signal to an external device (for example, another UE or the base station) that is not the wireless communication device 70. The remaining antennas of the plurality of antennas may correspond to (e.g., may be) the receiving antennas. The receiving antenna(s) may receive a wireless signal from the external device.

For example, the RFIC 720 may obtain channel information between the wireless communication device 70 and the base station through the plurality of antennas. Specifically, the RFIC 720 may receive the CSI-RS from the base station. In addition, the at least one processor 710 may estimate the downlink channel based on the received CSI-RS and channel reciprocity. The at least one processor 710 may obtain transmission characteristic information of the wireless communication device 70. For example, the at least one processor 710 may obtain the transmission characteristic information by feeding back a modulated transmit signal before signaling the modulated transmit signal. As another example, the at least one processor 710 may obtain the transmission characteristic information by performing calibration on the transmit signal in a process of modulating the transmit signal.

The at least one processor 710 may calculate an effective channel matrix between the wireless communication device 70 and the base station based on the obtained transmission characteristic information and channel information. The at least one processor 710 may determine a precoding matrix maximizing or increasing effective channel capacity by using the effective channel matrix. The at least one processor 710 may determine the precoding matrix based on a first matrix generated by applying SVD to the effective channel matrix and an allocated power ratio per transmission path. The first matrix may correspond to $\overline{V}$ of the above-described EQUATION 5. The at least one processor 710 may determine allocated power per transmission path by applying the water-filling algorithm to the second matrix generated by applying SVD to the effective channel matrix. The second matrix may correspond to $\overline{S}$ of the above-described EQUATION 5.

The at least one processor 710 may determine a transmit beamforming vector based on the determined precoding matrix. The RFIC 720 may transmit the SRS to the base station based on the transmit beamforming vector determined by one or more radiators. The RFIC 720 may receive the SRI from the base station through one or more receiving antennas. The SRI may include the rank and beamforming vector information related to transmission of the PUSCH. The rank and beamforming vector information related to transmission of the PUSCH may be determined based on the SRS. The RFIC 720 may transmit the PUSCH based on the SRI received through the one or more radiators.

To implement a non-codebook-based uplink transmission mode for NR MIMO communication, a UE calculates a precoding matrix. Conventional devices and methods for calculating the precoding matrix calculate the precoding matrix based only on channel data (e.g., data characterizing a channel between the UE and another device, such as a base station). The conventional devices and methods fail to consider transmission characteristic information of the UE in calculating the precoding matrix. Since the transmission characteristic information corresponds to (e.g., characterizes) transmission characteristics of the UE that may effect uplink transmission, the precoding matrix calculated by the conventional devices and methods may provide insufficient channel capacity (e.g., insufficient spectral efficiency and/or frequency efficiency).

However, according to embodiments, improved devices and methods are provided for calculating a precoding matrix. The improved devices and methods may calculate the precoding matrix based on channel information and transmission characteristic information of the UE. Accordingly, the improved devices and methods overcome the deficiencies of the conventional devices and methods to at least calculate a precoding matrix having higher channel capacity (e.g., increased spectral efficiency and/or frequency efficiency).

According to embodiments, operations described herein as being performed by the transmitter 10, the receiver 20, the transmitter 30, the receiver 40, the UE 50, the base station 60, the wireless communication device 70, the at least one processor 710 and/or the RFIC 720 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

It will be understood that when an element is referred to as being "connected" or "coupled" to another element, it may be directly connected or coupled to the other element or intervening elements may be present. As used herein the term "and/or" includes any and all combinations of one or more of the associated listed items.

While the inventive concepts have been particularly shown and described with reference to embodiments thereof, it will be understood that various changes in form and details may be made therein without departing from the spirit and scope of the following claims.

What is claimed is:

1. An operating method of a wireless communication device, the operating method comprising:
    calculating an effective channel matrix between the wireless communication device and a base station based on transmission characteristic information and channel information, the transmission characteristic information corresponding to the wireless communication device, and the channel information corresponding to a channel between the wireless communication device and the base station;
    determining a precoding matrix based on the effective channel matrix; and
    determining a transmission beamforming vector based on the precoding matrix.

2. The operating method of claim 1, wherein the determining the precoding matrix determines the precoding matrix based on a first matrix and an amount of power allocated to each of a plurality of transmission paths of the wireless communication device, the first matrix and a second matrix being generated by performing singular value decomposition (SVD) on the effective channel matrix, and the amount of power allocated to each of the plurality of transmission paths determined by applying a water-filling algorithm to the second matrix.

3. The operating method of claim 1, wherein the transmission characteristic information comprises at least one of additional white Gaussian noise (AWGN), power amplifier non-linearity, in-phase and quadrature (IQ) mismatch, phased noise, local oscillator leakage (LOL), digital to analog conversion (DAC) quantization noise or thermal noise.

4. The operating method of claim 3, wherein the transmission characteristic information is modeled based on an error vector magnitude (EVM).

5. The operating method of claim 4, wherein the EVM changes based on at least one of a frequency band or a transmit power.

6. The operating method of claim 1, further comprising:
    obtaining the channel information including receiving a channel status information-reference signal (CSI-RS) from the base station, and estimating a downlink channel based on the CSI-RS, the downlink channel being between the wireless communication device and the base station.

7. The operating method of claim 6, further comprising:
transmitting a sounding reference signal (SRS) to the base station based on the transmission beamforming vector;
receiving a sounding reference signal resource indicator (SRI) from the base station in response to the transmitting the SRS, the SRI including a rank and beamforming vector information; and
transmitting a physical uplink shared channel (PUSCH) based on the SRI.

8. The operating method of claim 1, further comprising:
obtaining the transmission characteristic information including feeding back a modulated transmit signal before signaling the modulated transmit signal.

9. The operating method of claim 1, further comprising:
obtaining the transmission characteristic information including calibrating a transmission signal in a process of modulating the transmission signal.

10. A wireless communication device comprising:
processing circuitry configured to
calculate an effective channel matrix between the wireless communication device and a base station based on transmission characteristic information and channel information, the transmission characteristic information corresponding to the wireless communication device, and the channel information corresponding to a channel between the wireless communication device and the base station,
determine a precoding matrix based on the effective channel matrix, and
determine a transmission beamforming vector based on the precoding matrix.

11. The wireless communication device of claim 10, wherein the processing circuitry is configured to determine the precoding matrix based on a first matrix and an amount of power allocated to each of a plurality of transmission paths of the wireless communication device, the first matrix and a second matrix being generated by performing singular value decomposition (SVD) on the effective channel matrix, and the amount of power allocated to each of the plurality of transmission paths being determined by applying a water-filling algorithm to the second matrix.

12. The wireless communication device of claim 10, wherein the transmission characteristic information comprises at least one of additional white Gaussian noise (AWGN), power amplifier non-linearity, in-phase and quadrature (IQ) mismatch, phased noise, local oscillator leakage (LOL), digital to analog conversion (DAC) quantization noise or thermal noise.

13. The wireless communication device of claim 12, wherein the transmission characteristic information is modeled based on an error vector magnitude (EVM).

14. The wireless communication device of claim 13, wherein the EVM changes based on at least one of a frequency band or a transmission power.

15. The wireless communication device of claim 10, wherein the processing circuitry is configured to:
obtain the channel information including
receiving a channel status information-reference signal (CSI-RS) from the base station, and
estimating a downlink channel based on the CSI-RS and channel reciprocity.

16. The wireless communication device of claim 15, wherein the processing circuitry is configured to:
transmit a sounding reference signal (SRS) to the base station based on the transmission beamforming vector;
receive a sounding reference signal resource indicator (SRI) from the base station in response to the transmission of the SRS, the SRI including a rank and beamforming vector information; and
transmit a physical uplink shared channel (PUSCH) based on the SRI.

17. The wireless communication device of claim 10, wherein the processing circuitry is configured to obtain the transmission characteristic information including feeding back a modulated transmit signal before signaling the modulated transmit signal.

18. The wireless communication device of claim 10, wherein the processing circuitry is configured to obtain the transmission characteristic information including calibrating a transmission signal in a process of modulating the transmission signal.

19. A wireless communication system comprising:
a wireless communication device; and
a base station configured to transmit a channel status information-reference signal (CSI-RS) to the wireless communication device,
wherein the wireless communication device is configured to
estimate an uplink channel based on the CSI-RS and channel reciprocity to obtain channel information,
calculate an effective channel matrix between the wireless communication device and the base station based on transmission characteristic information and the channel information, the transmission characteristic information corresponding to the wireless communication device,
determine a precoding matrix based on the effective channel matrix, and
determine a transmission beamforming vector based on the precoding matrix.

20. The wireless communication system of claim 19, wherein
the wireless communication device is configured to transmit a sounding reference signal (SRS) to the base station based on the transmission beamforming vector;
the base station is configured to
determine a rank and beamforming vector information based on the SRS, and
transmit a sounding reference signal resource indicator (SRI) to the wireless communication device, the SRI including the rank and beamforming vector information; and
the wireless communication device is configured to transmit a physical uplink shared channel (PUSCH) to the base station based on the SRI.

* * * * *